(12) United States Patent
Izumi et al.

(10) Patent No.: US 12,315,889 B2
(45) Date of Patent: May 27, 2025

(54) BATTERY

(71) Applicant: TOYOTA JIDOSHA KABUSHIKI KAISHA, Toyota (JP)

(72) Inventors: Jun Izumi, Toyota (JP); Masato Ono, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 555 days.

(21) Appl. No.: 17/851,524

(22) Filed: Jun. 28, 2022

(65) Prior Publication Data

US 2023/0051236 A1   Feb. 16, 2023

(30) Foreign Application Priority Data

Aug. 10, 2021 (JP) .................. 2021-130652

(51) Int. Cl.
| | | |
|---|---|---|
| *H01M 10/0585* | (2010.01) | |
| *H01M 50/46* | (2021.01) | |
| *H01M 50/463* | (2021.01) | |

(52) U.S. Cl.
CPC ....... *H01M 10/0585* (2013.01); *H01M 50/46* (2021.01); *H01M 50/463* (2021.01)

(58) Field of Classification Search
CPC . H01M 10/0585; H01M 50/46; H01M 50/463
See application file for complete search history.

(56) References Cited

FOREIGN PATENT DOCUMENTS

| JP | 2007250449 A | * | 9/2007 | |
| JP | 2015-125941 A | | 7/2015 | |
| JP | 2018081857 A | * | 5/2018 | ............. H01G 11/26 |
| JP | 2020-170667 A | | 10/2020 | |

* cited by examiner

*Primary Examiner* — Kevin E Yoon
(74) *Attorney, Agent, or Firm* — Sughrue Mion, PLLC

(57) ABSTRACT

A battery including power generation units each including a positive electrode layer, a separator layer, and a negative electrode layer. The area of either one of the positive electrode layer and the negative electrode layer is larger than the area of the other one of the positive electrode layer and the negative electrode layer. The power generation units each has a non-facing region. In the non-facing region, a first penetration portion is placed. The power generation units provided as the pair are stacked along the thickness direction via a first current collector including a second penetration portion corresponding to the first penetration portions. In the power generation units provided as the pair, two separator layers facing each other are fixed by a first fixing portion positioned in the first penetration portion and the second penetration portion.

7 Claims, 6 Drawing Sheets

BATTERY

CROSS-REFERENCE TO RELATED APPLICATION

This application claims priority to Japanese Patent Application No. 2021-130652 filed on Aug. 10, 2021, incorporated herein by reference in its entirety.

BACKGROUND

1. Technical Field

This disclosure relates to a battery.

2. Description of Related Art

There has been known a battery in which a plurality of power generation units is stacked along the thickness direction of the battery. Each of the power generation units includes a positive electrode layer, a separator layer, and a negative electrode layer. For example, Japanese Unexamined Patent Application Publication No. 2020-170667 (JP 2020-170667 A) describes a stacked-type battery manufacturing method including: a first preparing step of preparing a first electrode plate; a second preparing step of preparing a second electrode plate; and a stacking step of forming an electrode stacked body by stacking the first electrode plate and the second electrode plate in a stacked direction with an insulator being provided between the first electrode plate and the second electrode plate such that a first electrode active material layer and a second electrode active material layer face each other. In JP 2020-170667 A, in order to restrain a positional deviation between the first electrode plate and the second electrode plate, a first welding material layer is provided in the first electrode plate.

SUMMARY

As described in JP 2020-170667 A, by providing the first welding material layer, a positional deviation in an electrode body can be restrained. On the other hand, the energy density of the battery (the energy density per volume) might decrease.

This disclosure is accomplished in view of the above problem, and a main object of this disclosure is to provide a battery that can restrain a decrease in energy density and restrain a positional deviation in an electrode body.

This disclosure provides a battery including power generation units each including a positive electrode layer, a separator layer, and a negative electrode layer. The area of either one of the positive electrode layer and the negative electrode layer is larger than the area of the other one of the positive electrode layer and the negative electrode layer in a plan view along the thickness direction of the battery. The power generation units each have a non-facing region where the positive electrode layer and the negative electrode layer do not face each other. In the non-facing region, a first penetration portion as a hole or a cutout is placed. The battery includes a stacked electrode body including at least a pair of the power generation units. The power generation units provided as the pair are stacked along the thickness direction via a first current collector including a second penetration portion corresponding to the first penetration portions of the power generation units provided as the pair. In the power generation units provided as the pair, two separator layers facing each other are fixed by a first fixing portion positioned in the first penetration portions and the second penetration portion.

With this disclosure, since the two separator layers facing each other are fixed by the first fixing portion placed in the first penetration portions provided in the non-facing region, it is possible to restrain a decrease in energy density and to restrain a positional deviation in the electrode body.

In the above disclosure, the first fixing portion may include a member different from the two separator layers facing each other.

In the above disclosure, the first fixing portion may include part of at least either one of the two separator layers facing each other.

In the above disclosure, the first fixing portion may have cavities through which an electrolytic solution passes.

In the above disclosure, the first fixing portion may not have cavities through which an electrolytic solution passes.

In the above disclosure, the power generation units provided as the pair may be connected in parallel to each other.

In the above disclosure, the stacked electrode body may include a pair of power generation structural bodies each constituted by the power generation units provided as the pair and connected in parallel to each other. The power generation structural bodies may be stacked along the thickness direction. In the power generation structural bodies, two separator layers facing each other may be fixed by a second fixing portion.

In the above disclosure, the power generation units provided as the pair may be connected in series to each other.

In the above disclosure, the battery may include a laminate-type outer packaging body configured to seal the stacked electrode body. The stacked electrode body may include an outer separator layer provided on a surface of the stacked electrode body, the surface being on a side closer to the outer packaging body. The outer separator layer may be fixed to the separator layer in a corresponding one of the power generation units by a third fixing portion.

The battery in this disclosure yields effects that a decrease in energy density can be restrained and a positional deviation in the electrode body can be restrained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The following describes a battery in this disclosure in detail with reference to the drawings. Each of the following drawings is illustrated schematically, and the magnitude and the shape of each part are exaggerated appropriately to facilitate understanding. Further, in each of the drawings, hatching indicating a section of a member is omitted appropriately.

Figure 1A:
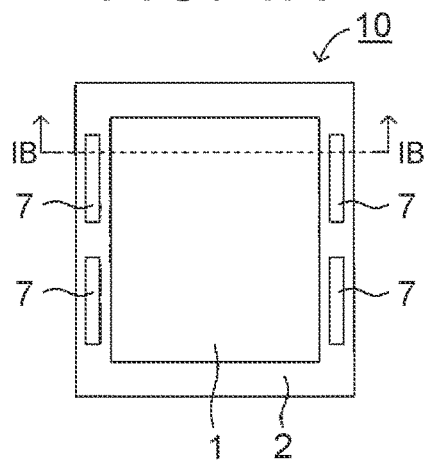
FIG. 1A illustrates a schematic plan view illustrating a power generation unit in this disclosure.
Figure 1C:
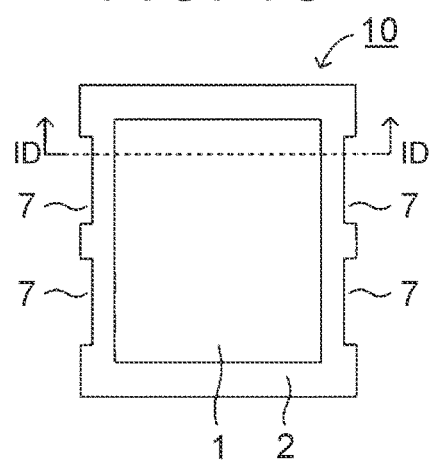
FIG. 1C illustrates a schematic plan view illustrating a power generation unit in this disclosure.
Figure 1B:
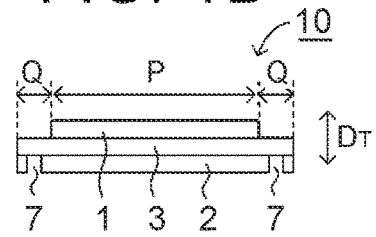
FIG. 1B illustrates a schematic sectional view illustrating a power generation unit in this disclosure.

FIG. 1A is a schematic plan view illustrating a power generation unit in this disclosure, and FIG. 1B is a sectional view taken along a line IB-IB in FIG. 1A. Note that, in FIG. 1A, a separator layer is omitted for convenience. As illustrated in FIG. 1B, the power generation unit 10 includes a positive electrode layer 1, a separator layer 3, and a negative electrode layer 2 in this order along a thickness direction $D_T$. Further, the area of the negative electrode layer 2 is larger than the area of the positive electrode layer 1. When the area of the negative electrode layer 2 is made relatively larger than the area of the positive electrode layer 1, it is possible to restrain deposition of dendrite. Further, as illustrated in FIG. 1B, a region where the positive electrode layer 1 and the negative electrode layer 2 face each other is referred to as a facing region P, and a region where the positive electrode layer 1 and the negative electrode layer 2 do not face each other is referred to as a non-facing region Q. As illustrated in FIGS. 1A, 1B, a first penetration portion 7 as a hole is placed in the non-facing region Q.

Figure 1D:
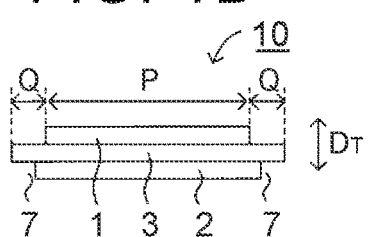
FIG. 1D illustrates a schematic sectional view illustrating a power generation unit in this disclosure.

Further, FIG. 1C is a schematic plan view illustrating a power generation unit in this disclosure, and FIG. 1D is a sectional view taken along a line ID-ID in FIG. 1C. Note that, in FIG. 1C, a separator layer is omitted for convenience. As illustrated in FIGS. 1C, 1D, the first penetration portion 7 as a cutout is placed in the non-facing region Q.

Figure 2:
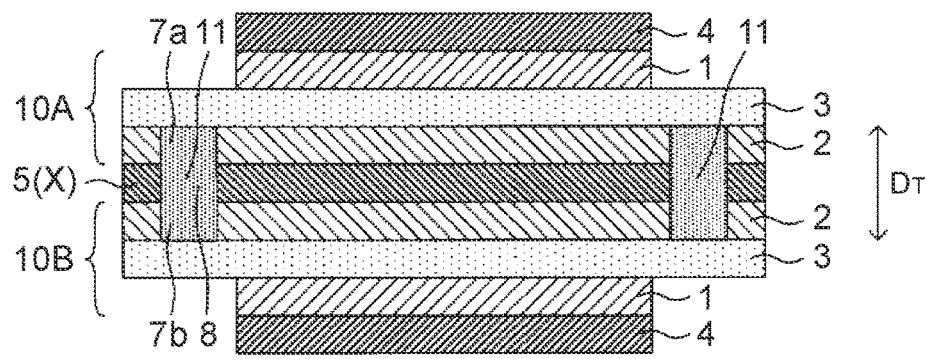
FIG. 2 is a schematic sectional view illustrating a pair of power generation units in this disclosure.

A battery in this disclosure includes at least a pair of power generation units. FIG. 2 is a schematic sectional view illustrating the power generation units in this disclosure. As illustrated in FIG. 2, the power generation units (a power generation unit 10A and a power generation unit 10B) are stacked along the thickness direction $D_T$ via a first current collector X. In FIG. 2, the negative electrode layer 2 in the power generation unit 10A is electrically connected to the negative electrode layer 2 in the power generation unit 10B, via a negative-electrode current collector 5 as the first current collector X. That is, the power generation unit 10A and the power generation unit 10B are connected in parallel to each other. Further, the first current collector X includes a second penetration portion 8 at a position corresponding to a first penetration portion 7a formed in the power generation unit 10A and a first penetration portion 7b formed in the power generation unit 10B. The separator layer 3 formed in the power generation unit 10A and the separator layer 3 formed in the power generation unit 10B face each other via the first penetration portion 7a, the second penetration portion 8, and the first penetration portion 7b. A first fixing portion 11 is placed in the first penetration portion 7a, the second penetration portion 8, and the first penetration portion 7b, so that the two separator layers 3 facing each other are fixed by the first fixing portion 11.

Figure 3:
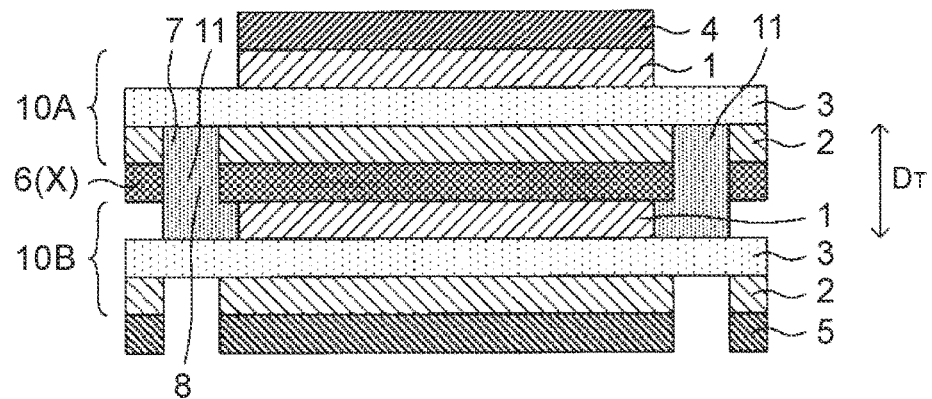
FIG. 3 is a schematic sectional view illustrating a pair of power generation units in this disclosure.

FIG. 3 is a schematic sectional view illustrating a pair of power generation units in this disclosure. As illustrated in FIG. 3 the power generation units (the power generation unit 10A and the power generation unit 10B) are stacked along the thickness direction $D_T$ via the first current collector X. In FIG. 3, the negative electrode layer 2 in the power generation unit 10A is electrically connected to the positive electrode layer 1 in the power generation unit 10B via a bipolar current collector 6 as the first current collector X. That is, the power generation unit 10A and the power generation unit 10B are connected in series to each other. Further, the first current collector X includes the second penetration portion 8 at a position corresponding to the first penetration portion 7 formed in the power generation unit 10A. The separator layer 3 formed in the power generation unit 10A and the separator layer 3 formed in the power generation unit 10B face each other via the first penetration portion 7 and the second penetration portion 8. The first fixing portion 11 is placed in the first penetration portion 7 and the second penetration portion 8, so that the two separator layers 3 facing each other are fixed by the first fixing portion 11.

In this disclosure, the two separator layers facing each other are fixed by the first fixing portion positioned in the first penetration portion placed in the non-facing region. This accordingly makes it possible to restrain a decrease in energy density and to restrain a positional deviation in an electrode body. As described above, when a welding material layer is provided, it is possible to restrain a positional deviation in an electrode body. On the other hand, the energy density of a battery (the energy density per volume) might decrease. In contrast, in this disclosure, the first fixing portion is provided in the first penetration portion placed in the non-facing region. This accordingly makes it possible to restrain the energy density of the battery from decreasing. Further, since the two separator layers facing each other are fixed by use of the first fixing portion, it is possible to restrain a positional deviation in the electrode body.

1. Power Generation Unit

A power generation unit in this disclosure includes a positive electrode layer, a separator layer, and a negative electrode layer. Further, the area of either one of the positive electrode layer and the negative electrode layer is larger than the area of the other one of the positive electrode layer and the negative electrode layer. That is, the area of the positive electrode layer may be larger than the area of the negative electrode layer or may be smaller than the area of the negative electrode layer. From the viewpoint of restraining deposition of dendrite, it is preferable that the area of the negative electrode layer be larger than the area of the positive electrode layer. Further, in terms of the positive electrode layer and the negative electrode layer, the area of a larger layer is referred to as $S_1$, and the area of a smaller layer is referred to as $S_2$: The ratio of $S_1$ to $S_2$ ($S_1/S_2$) is 1.03 or more and may be 1.05 or more, for example. In the meantime, the upper limit of $S_1/S_2$ is not limited in particular. However, when the value of $S_1/S_2$ is large, the energy density of the battery might decrease. Note that the area of the positive electrode layer or the negative electrode layer indicates the area of a figure specified from the outer edge of the positive electrode layer or the negative electrode layer.

The shape of each of the positive electrode layer, the separator layer, and the negative electrode layer in a plan view is not limited in particular. Examples of the shape include rectangular shapes such as a square shape and an oblong shape, and round shapes such as a perfect circular shape and an oval shape.

Figure 4A:
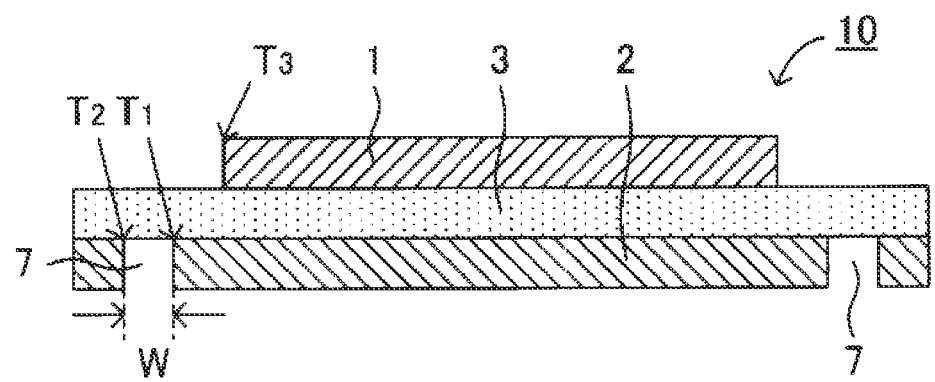
FIG. 4A illustrates a schematic sectional view illustrating a power generation unit in this disclosure.
Figure 4B:
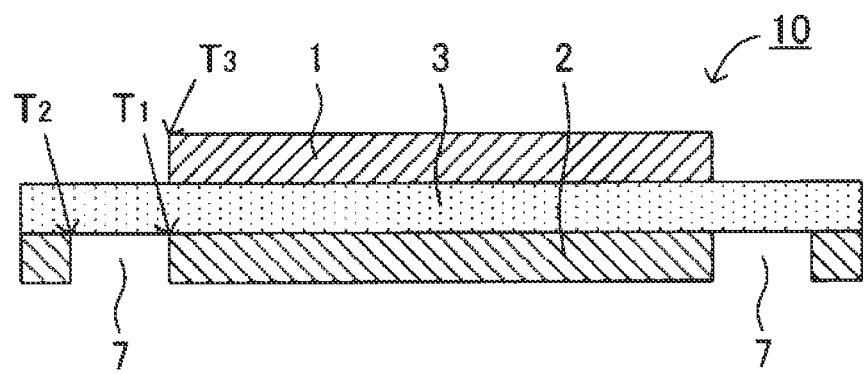
FIG. 4B illustrates a schematic sectional view illustrating a power generation unit in this disclosure.
Figure 4C:
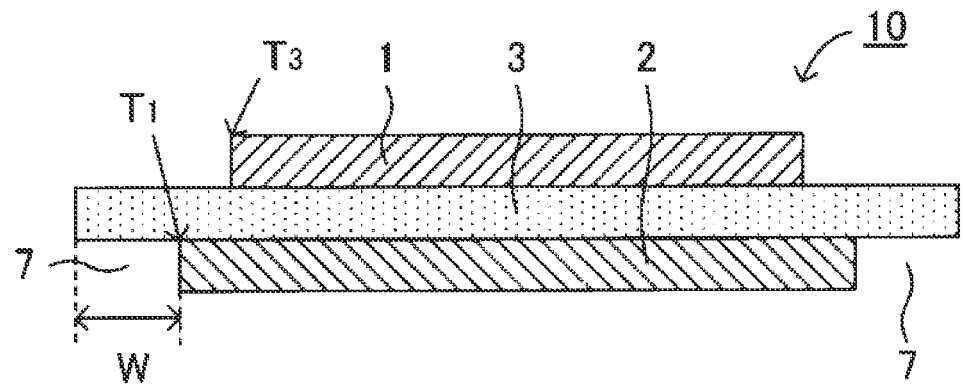
FIG. 4C illustrates a schematic sectional view illustrating a power generation unit in this disclosure.

The power generation unit has a non-facing region where the positive electrode layer and the negative electrode layer do not face each other. As described above, the positive electrode layer and the negative electrode layer have different areas. Accordingly, when the power generation unit is viewed in a plan view along its thickness direction, the non-facing region where the positive electrode layer and the negative electrode layer do not face (overlap with) each other is formed. In the non-facing region, a first penetration portion as a hole or a cutout is placed. In a case where the width of the first penetration portion 7 is referred to as W as illustrated in FIGS. 4A, 4C, for example, W may be not less than 0.5 mm but not more than 3 mm or may be not less than 1 mm but not more than 2 mm, for example. Further, in a case where the first penetration portion is a hole, the shape of the first penetration portion in a plan view is not limited in particular. However, examples of the shape include rectangular shapes such as a square shape and an oblong shape, and round shapes such as a perfect circular shape and an oval shape.

As illustrated in FIG. 4A, in a case where the first penetration portion 7 is a hole, the first penetration portion 7 has an end part $T_1$ positioned on the inner side (a side close to the gravitational center of the negative electrode layer 2), and an end part $T_2$ positioned on the outer side (a side distant from the gravitational center of the negative electrode layer 2). As illustrated in FIG. 4A, the end part $T_1$ in the first penetration portion 7 may be present outwardly from an end part $T_3$ of the positive electrode layer 1 in a plan view along the thickness direction. In the meantime, as illustrated in FIG. 4B, the end part $T_1$ in the first penetration portion 7 may overlap with the end part $T_3$ of the positive electrode layer 1 in a plan view along the thickness direction. Further, although not illustrated herein in particular, an end part in the first penetration portion may be present inwardly from an end part of the positive electrode layer in a plan view along the thickness direction. The end part $T_3$ in this disclosure is an end part of an electrode layer having a relatively small area. In FIGS. 4A, 4B, since the area of the positive electrode layer 1 is smaller than the area of the negative electrode layer 2, the end part $T_3$ corresponds to the end part of the positive electrode layer 1. In the meantime, in a case where the area of the positive electrode layer is larger than the area of the negative electrode layer, the end part $T_3$ corresponds to an end part of the negative electrode layer.

Further, as illustrated in FIG. 4C, in a case where the first penetration portion 7 is a cutout, the first penetration portion 7 has the end part $T_1$, but the first penetration portion 7 does not have the end part $T_2$ provided in FIGS. 4A, 4B. In a case where the first penetration portion 7 is a cutout, there is such an advantage that, even when the area of the non-facing region is small, the first penetration portion 7 is easily placed. Further, the end part $T_1$ in FIG. 4C is present outwardly from the end part $T_3$ of the positive electrode layer 1 in a plan view along the thickness direction. However, the end part $T_1$ may overlap with the end part $T_3$ of the positive electrode layer 1 or may be present inwardly from the end part $T_3$ of the positive electrode layer 1 in a plan view along the thickness direction.

Figure 5A:
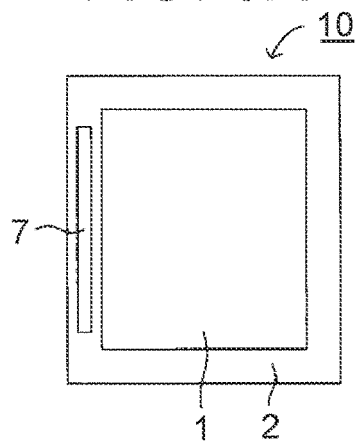
FIG. 5A illustrates a schematic plan view illustrating a power generation unit in this disclosure.
Figure 5C:
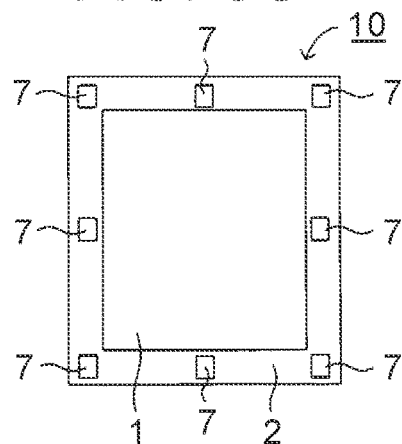
FIG. 5C illustrates a schematic plan view illustrating a power generation unit in this disclosure.
Figure 5B:
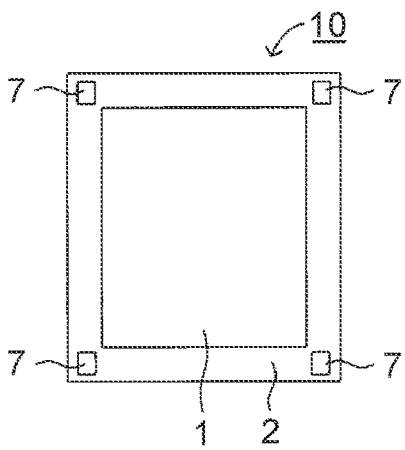
FIG. 5B illustrates a schematic plan view illustrating a power generation unit in this disclosure.

Further, as illustrated in FIGS. 1A to 1D, the power generation unit 10 may include a plurality of first penetration portions 7. In FIGS. 1A to 1D, a pair of first penetration portions 7 is placed such that the first penetration portions 7 face each other via the facing region P. In the meantime, FIGS. 5A, 5B, and 5C illustrate schematic plan views each illustrating a power generation unit in this disclosure, and a separator layer is omitted for convenience. As illustrated in FIG. 5A, the power generation unit 10 may include only one first penetration portion 7. In this case, it is preferable that the first penetration portion 7 be a hole. This is because a positional deviation can be restrained isotropically in comparison with a cutout. In the meantime, in a case where the first penetration portion is a cutout, it is preferable that the first penetration portions 7 be placed such that the first penetration portions 7 face each other via the facing region P, as illustrated in FIG. 1C. When the first penetration portions 7 are placed to face each other, it is possible to improve isotropy to the positional deviation. Further, the first penetration portions 7 may be placed at corners of the negative electrode layer 2 (a layer having a relatively large area) as illustrated in FIG. 5B, or the first penetration portions 7 may be placed at corners and sides of the negative electrode layer 2 (a layer having a relatively large area) as illustrated in FIG. 5C.

The power generation unit in this disclosure includes the positive electrode layer, the separator layer, and the negative electrode layer. The positive electrode layer contains at least a positive-electrode active material. The positive-electrode active material is, for example, an oxide active material. The oxide active material is, for example, a rock-salt layer type active material such as $LiNi_{1/3}Co_{1/3}Mn_{1/3}O_2$, a spinel type active material such as $LiMn_2O_4$, or an olivine type active material such as $LiFePO_4$. The shape of the positive-electrode active material is a particulate shape, for example. The negative electrode layer contains at least a negative-electrode active material. The negative-electrode active material is, for example, a metal oxide material such as Li or $S_1$, a carbon active material such as graphite, or an oxide active material such as $Li_4Ti_5O_{12}$. The shape of the negative-electrode active material is a particulate shape or a foil shape, for example.

Generally, the separator layer has cavities through which an electrolytic solution passes. The material for the separator layer is, for example, resin, glass, or ceramics. Examples of the resin include: olefin-based resin such polyethylene (PE) or polypropylene (PP); fluorinated resin such as polyvinylidene difluoride; cellulose; polyamide resin; and polyimide resin. The separator layer is, for example, a porous membrane containing the resin, a ceramic porous membrane, non-woven fabric containing the resin, or glass fiber non-woven fabric. Generally, the electrolytic solution contains supporting salt and solvent. Examples of the supporting salt include: inorganic salt such as $LiPF_6$ and $LiBF_4$; and organic salt such as $LiCF_3SO_3$, $LiN(CF_3SO_2)_2$, and $LiN(C_2F_5SO_2)_2$. Examples of the solvent include: cyclic carbonate such as ethylene carbonate (EC) and propylene carbonate (PC); and chain carbonate such as dimethyl carbonate (DMC), diethyl carbonate (DEC), and ethyl methyl carbonate (EMC).

2. Stacked Electrode Body

A stacked electrode body in this disclosure includes at least a pair of power generation units. As illustrated in FIG. 2, the power generation units (the power generation unit 10A and the power generation unit 10B) are stacked along the thickness direction $D_T$ via the first current collector X. Further, the first current collector X includes the second penetration portion 8 at a position corresponding to the first penetration portion 7a formed in the power generation unit 10A and the first penetration portion 7b formed in the power generation unit 10B. The second penetration portion 8 at least partially overlaps with the first penetration portion 7a in a plan view along the thickness direction $D_T$. Similarly, the second penetration portion 8 at least partially overlaps with the first penetration portion 7b in a plan view along the thickness direction $D_T$. Thus, generally, the first penetration portion and the second penetration portion at least partially overlaps with each other in a plan view along the thickness direction.

Further, the separator layer 3 formed in the power generation unit 10A and the separator layer 3 formed in the power generation unit 10B face each other via the first penetration portion 7a, the second penetration portion 8, and the first penetration portion 7b. The first fixing portion 11 is placed in the first penetration portion 7a, the second penetration portion 8, and the first penetration portion 7b, so that the two separator layers 3 facing each other are fixed by the first fixing portion 11.

The material of the first fixing portion is, for example, resin. The resin is, for example, thermoplastic resin, thermosetting resin, or ultraviolet curable resin. Concrete examples of the resin include: olefin-based resin such as polyethylene (PE) and polypropylene (PP); fluorinated resin such as polyvinylidene difluoride; cellulose; polyamide resin; and polyimide resin. Particularly, in this disclosure, it is preferable that the separator layer and the first fixing portion contain olefin-based resin. This is because the separator layer is fixed firmly by the first fixing portion.

Figure 6A:
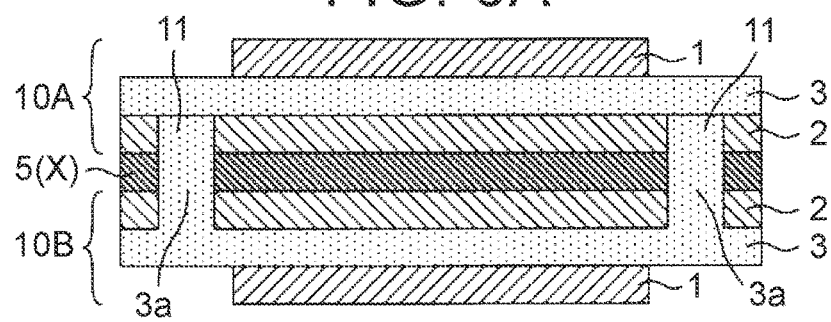
FIG. 6A illustrates a schematic sectional view illustrating a pair of power generation units in this disclosure.
Figure 6B:
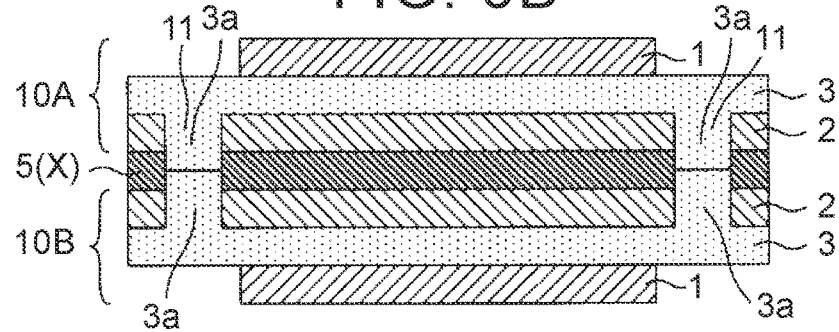
FIG. 6B illustrates a schematic sectional view illustrating a pair of power generation units in this disclosure.

The first fixing portion may include a member different from the two separator layers facing each other. For example, in FIG. 2, the first fixing portion 11 is constituted by a member different from the two separator layers 3 facing each other. In the meantime, the first fixing portion may include part of at least either of the two separator layers facing each other. For example, in FIG. 6A, one of the two separator layers 3 facing each other includes a protruding portion 3a, and the protruding portion 3a is inserted into the first penetration portion in the negative electrode layer 2 and the second penetration portion in the negative-electrode current collector 5. That is, the first fixing portion 11 is constituted by the protruding portion 3a of the separator layer 3. In the meantime, in FIG. 6B, both of the two separator layers 3 facing each other include respective protruding portions 3a, and the respective protruding portions 3a are inserted into respective first penetration portions in respective negative electrode layers 2 and the second penetration portion in the negative-electrode current collector 5. Even in this case, similarly to FIG. 6A, the first fixing portion 11 is constituted by the protruding portions 3a of the separator layers 3. Further, although not illustrated herein in particular, even in a case where the two separator layers 3 facing each other do not include protruding portions (e.g., even in a case where the two separator layers 3 facing each other have a flat shape as illustrated FIG. 2), the two separator layers facing each other may be fixed to each other by being directly joined to each other in a state where the two separator layers are distorted in the thickness direction. It can be said that this case also corresponds to the form where the first fixing portion includes part of at least either one of the two separator layers facing each other.

The first fixing portion may have cavities through which an electrolytic solution passes. Since the stacked electrode body has a structure in which a plurality of power generation units is stacked, the electrolytic solution is easily accumulated in a bottom portion of the stacked electrode body over time. In the meantime, when the first fixing portion has cavities, the electrolytic solution accumulated in the bottom portion can be dispersed over the whole stacked electrode body by a capillary phenomenon. In the meantime, the first fixing portion may not have cavities through which the electrolytic solution passes. In order to effectively restrain a positional deviation in the electrode body, for example, it is preferable that the separator layers facing each other be fixed firmly by use of the first fixing portion that does not have cavities.

Figure 7:
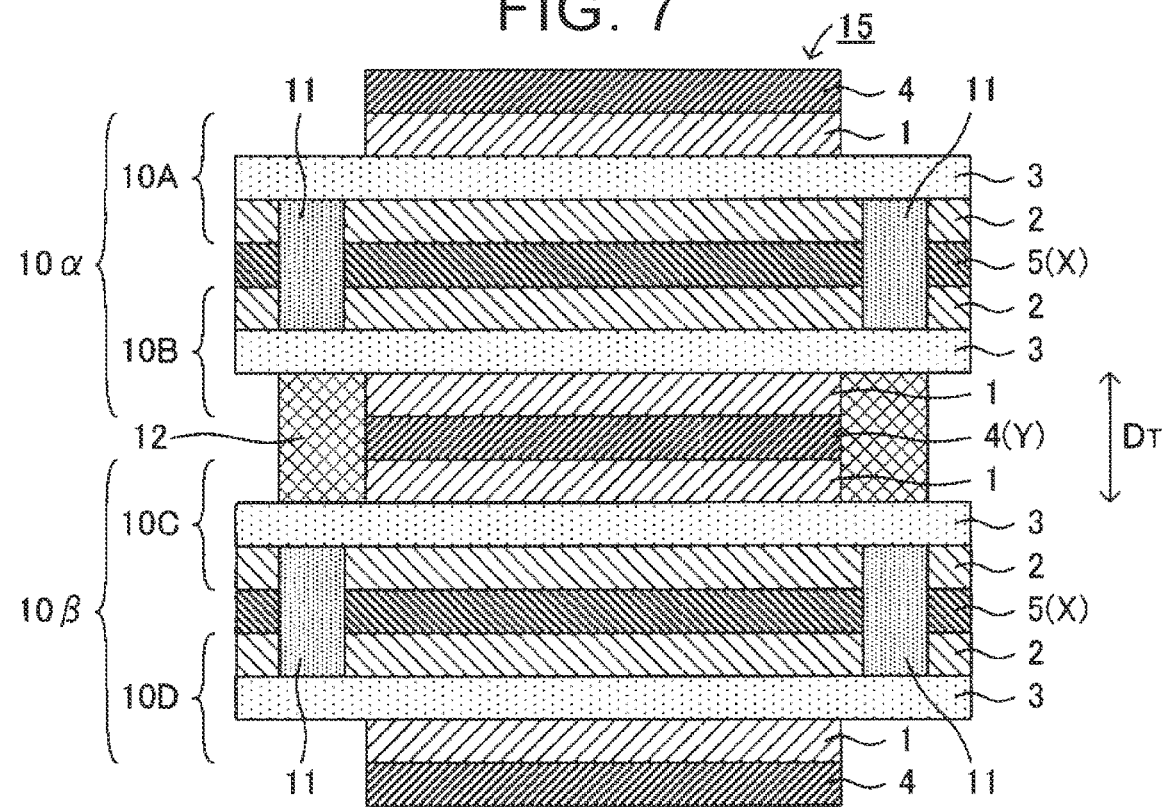
FIG. 7 is a schematic sectional view illustrating a stacked electrode body in this disclosure.

As illustrated in FIG. 7, the stacked electrode body 15 may include a plurality of power generation structural bodies each of which is constituted by a pair of power generation units connected in parallel to each other. More specifically, the stacked electrode body 15 in FIG. 7 includes a power generation structural body 10a constituted by a pair of power generation units (the power generation unit 10A and the power generation unit 10B) provided such that the power generation units are connected in parallel to each other, and a power generation structural body 10β constituted by a pair of power generation units (a power generation unit 10C and a power generation unit 10D) provided such that the power generation units are connected in parallel to each other, Further, a pair of power generation structural bodies (the power generation structural body 10α and the power generation structural body 10β is provided such that the power generation structural bodies are stacked along the thickness direction $D_T$ via a second current collector Y. In FIG. 7, the positive electrode layer 1 in the power generation unit 10B of the power generation structural body 10α is electrically connected to the positive electrode layer 1 in the power generation unit 10C of the power generation structural body 10β via a positive-electrode current collector 4 as the second current collector Y. Further, in the power generation structural bodies (the power generation structural body 10α and the power generation structural body 10 β), the separator layer 3 in the power generation unit 10B of the power generation structural body 10α faces the separator layer 3 in the power generation unit 10C of the power generation structural body 10β. The two separator layers 3 facing each other are fixed by a second fixing portion 12. As a result, all the separator layers 3 in the stacked electrode body 15 are fixed to each other by the first fixing portion 11 and the second fixing portion 12. Details of the second fixing portion 12 are similar to those of the first fixing portion 11. Differently from the first fixing portion 11, generally, the second fixing portion 12 is not positioned in the first penetration portion and the second penetration portion. The second fixing portion 12 and the first fixing portion 11 may be placed such that the second fixing portion 12 and the first fixing portion 11 at least partially overlap each other in a plan view along the thickness direction.

Figure 8:
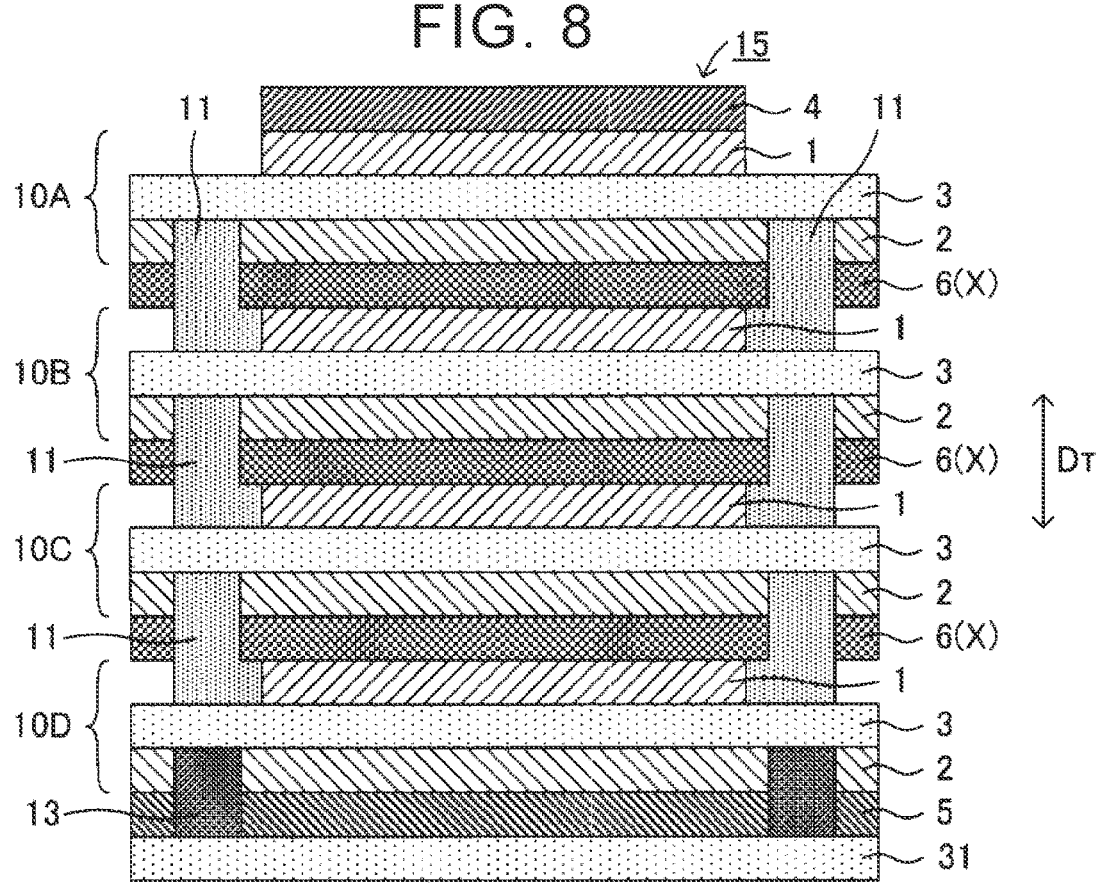
FIG. 8 is a schematic sectional view illustrating a stacked electrode body in this disclosure.

As illustrated in FIG. 8, the stacked electrode body 15 may include a plurality of power generation units connected in series to each other. More specifically, in the stacked electrode body 15 in FIG. 8, the power generation unit 10A, the power generation unit 10B, the power generation unit 10C, and the power generation unit 10D are stacked along the thickness direction $D_T$, and the power generation units 10A to 10D are connected in series to each other. In power generation units adjacent to each other, two separator layers 3 facing each other are fixed by the first fixing portion 11. As a result, all the separator layers 3 in the stacked electrode body 15 are fixed to each other by the first fixing portion 11.

Figure 9:
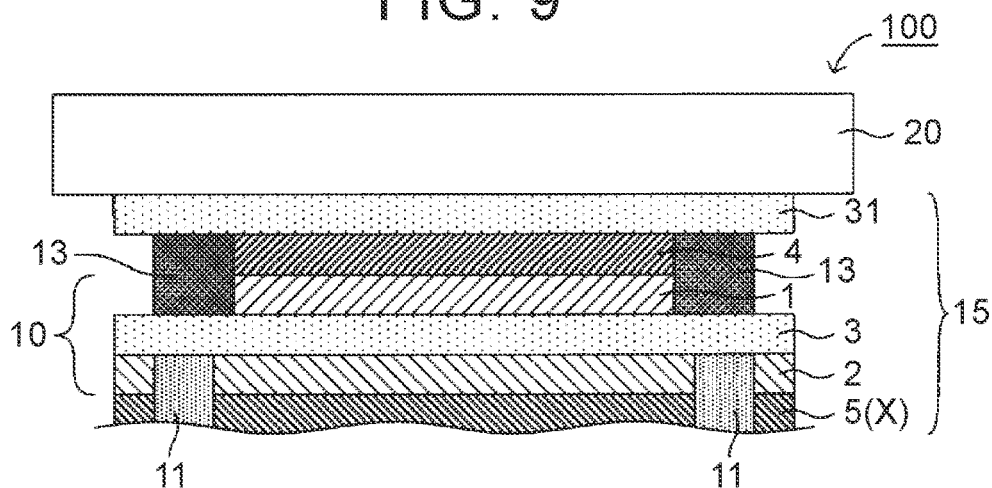
FIG. 9 is a schematic sectional view illustrating a battery in this disclosure.

As illustrated in FIG. 9, a battery 100 may include a laminate-type outer packaging body 20 configured to seal the stacked electrode body 15. In FIG. 9, the stacked electrode body 15 includes an outer separator layer 31 provided on a surface of the stacked electrode body 15, the surface being on a side closer to the outer packaging body 20. The outer separator layer 31 and the separator layer 3 in the power generation unit 10 may be fixed to each other by a third fixing portion 13. By providing the third fixing portion 13, it is possible to restrain a positional deviation in the electrode body. Details of the third fixing portion 13 are similar to those of the first fixing portion 11. The third fixing portion 13 may not be positioned in the first penetration portion and the second penetration portion as illustrated in FIG. 9 or may be positioned in the first penetration portion (the penetration portion in the power generation unit 10D) and a penetration portion of the electrode current collector (the negative-electrode current collector 5), as illustrated in FIG. 8.

Further, as illustrated in FIG. 9, the third fixing portion 13 and the first fixing portion 11 may be placed such that the third fixing portion 13 and the first fixing portion 11 at least partially overlap with each other in a plan view along the thickness direction. Further, the outer packaging body 20 and the outer separator layer 31 may be fused to each other at a position at least partially overlapping with the third fixing portion 13 in a plan view along the thickness direction. Further, the outer packaging body 20 and the outer separator layer 31 may be fused to each other over the whole surface of the outer separator layer 31.

A manufacturing method for manufacturing the stacked electrode body in this disclosure is not limited in particular. FIGS. 10A, 10B, 10C, 10D, and 10E are schematic sectional views illustrating a manufacturing method for manufacturing the stacked electrode body in this disclosure. More specifically, FIGS. 10A, 10B, 10C, 10D, and 10E are schematic sectional views illustrating a manufacturing method for manufacturing a stacked electrode body including power generation units (the power generation unit 10A and the power generation unit 10B) provided as a pair and connected in parallel to each other as illustrated in FIG. 2.

Figure 10A:
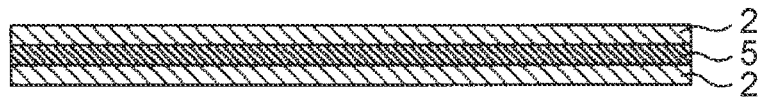
FIG. 10A is a schematic sectional view illustrating a manufacturing method for manufacturing a stacked electrode body in this disclosure.
Figure 10B:
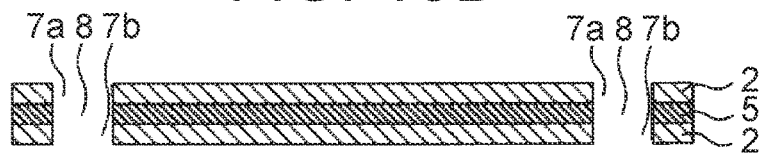
FIG. 10B is a schematic sectional view illustrating a manufacturing method for manufacturing a stacked electrode body in this disclosure.
Figure 10C:
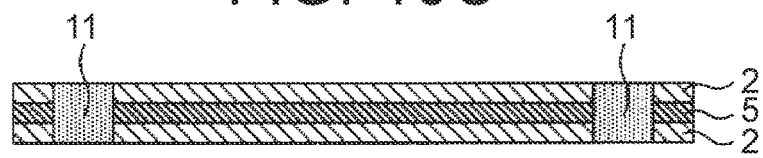
FIG. 10C is a schematic sectional view illustrating a manufacturing method for manufacturing a stacked electrode body in this disclosure.
Figure 10D:
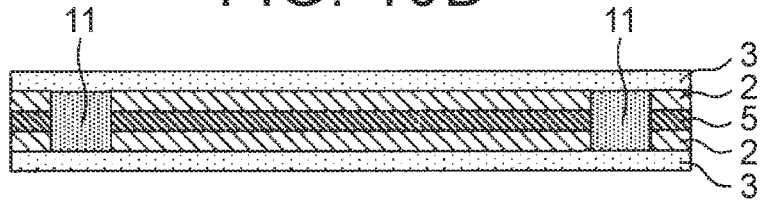
FIG. 10D is a schematic sectional view illustrating a manufacturing method for manufacturing a stacked electrode body in this disclosure.
Figure 10E:
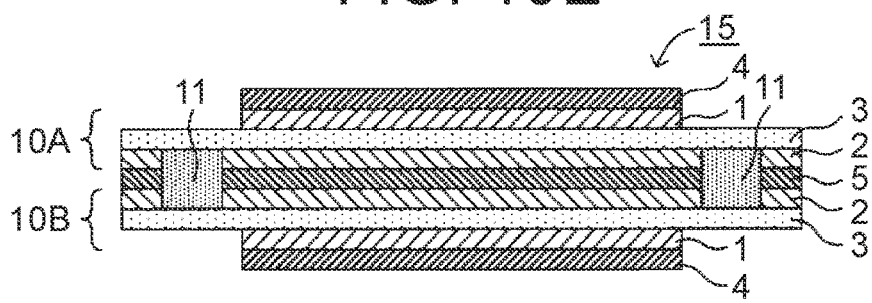
FIG. 10E is a schematic sectional view illustrating a manufacturing method for manufacturing a stacked electrode body in this disclosure.

Finally, as illustrated in FIG. 10A, a negative electrode in which the negative electrode layer 2 is formed on each surface of the negative-electrode current collector 5 is prepared. Then, as illustrated in FIG. 10B, punching or laser machining is performed on the negative electrode, so that the first penetration portion 7a, the second penetration portion 8, and the first penetration portion 7b are formed. Then, as illustrated in FIG. 10C, the first fixing portion 11 is placed in the first penetration portion 7a, the second penetration portion 8, and the first penetration portion 7b. Subsequently, as illustrated in FIG. 10D, respective separator layers 3 are placed on respective surfaces of the two negative electrode layers 2. At this time, two separator layers 3 are placed to cover the first fixing portion 11 in a plan view along the thickness direction. Then, respective positive electrodes (each including the positive electrode layer 1 and the positive-electrode current collector 4) on respective surfaces of the two separator layers 3. Here, in FIG. 10D, the two separator layers 3 are fixed to the first fixing portion 11 at a given timing after the two separator layers 3 are placed. Hereby, the stacked electrode body 15 is provided. A method for joining the two separator layers 3 and the first fixing portion 11 is, for example, heat sealing.

Further, FIGS. 11A, 11B, 11C, 11D, and 11E are schematic sectional views illustrating a manufacturing method for manufacturing the stacked electrode body in this disclosure. More specifically, FIGS. 11A, 11B, 11C, 11D, and 11E are schematic sectional views illustrating a manufacturing method for manufacturing a stacked electrode body including power generation units (the power generation unit 10A and the power generation unit 10B) provided as a pair and connected in series to each other as illustrated in FIG. 3.

Figure 11A:
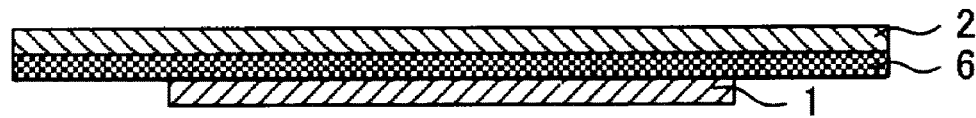
FIG. 11A is a schematic sectional view illustrating a manufacturing method for manufacturing a stacked electrode body in this disclosure.
Figure 11B:
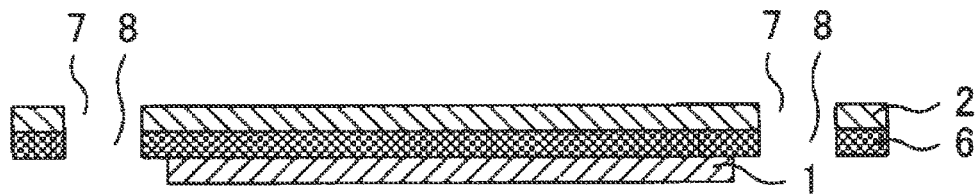
FIG. 11B is a schematic sectional view illustrating a manufacturing method for manufacturing a stacked electrode body in this disclosure.
Figure 11C:
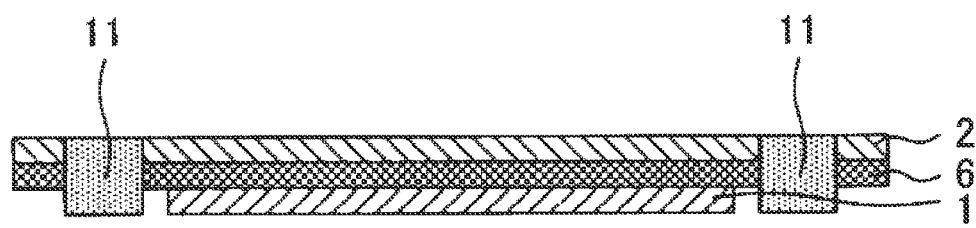
FIG. 11C is a schematic sectional view illustrating a manufacturing method for manufacturing a stacked electrode body in this disclosure.
Figure 11D:
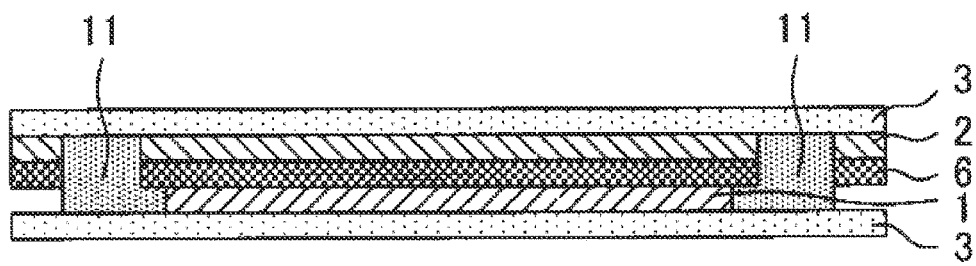
FIG. 11D is a schematic sectional view illustrating a manufacturing method for manufacturing a stacked electrode body in this disclosure.
Figure 11E:
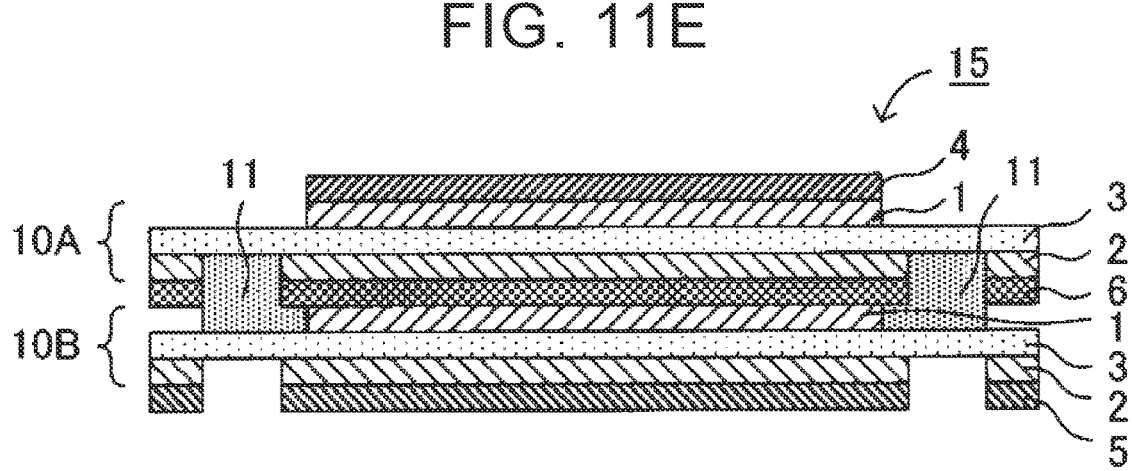
FIG. 11E is a schematic sectional view illustrating a manufacturing method for manufacturing a stacked electrode body in this disclosure.

First, as illustrated in FIG. 11A, a bipolar electrode including the bipolar current collector 6, the positive electrode layer 1 formed on a first surface side of the bipolar current collector 6, and the negative electrode layer 2 formed on a second surface side of the bipolar current collector 6 is prepared. Then, as illustrated in FIG. 11B, punching or laser machining is performed on the bipolar electrode, so that the first penetration portion 7 and the second penetration portion 8 are formed. Subsequently, as illustrated in FIG. 11C, the first fixing portion 11 is placed in the first penetration portion 7 and the second penetration portion 8. Then, as illustrated in FIG. 11D, respective separator layers 3 are placed on respective surfaces of the positive electrode layer 1 and the negative electrode layer 2. At this time, two separator layers 3 are placed to cover the first fixing portion 11 in a plan view along the thickness direction. Then, a positive electrode (including the positive electrode layer 1 and the positive-electrode current collector 4) is placed on a surface of the separator layer 3 on the negative electrode layer 2 side, and a negative electrode (including the negative electrode layer 2 and the negative-electrode current collector 5) is placed on a surface of the separator layer 3 on the positive electrode layer 1 side. Here, in FIG. 11D, the two separator layers 3 are fixed to the first fixing portion 11 at a given timing after the two separator layers 3 are placed. Thus, the stacked electrode body 15 is provided.

3. Battery

The type of the battery in this disclosure is not limited in particular, but the battery in this disclosure is typically a lithium-ion secondary battery. Further, a usage purpose of the battery in this disclosure is not limited in particular. However, the battery in this disclosure is used for a power supply of a vehicle such as a hybrid electric vehicle (HEV), a battery electric vehicle (BEV), a gasoline-fueled automobile, or a diesel powered automobile, for example. Particularly, it is preferable that the battery in this disclosure be used for a drive power supply of a hybrid electric vehicle or a battery electric vehicle. Further, the battery in this disclosure may be used as a power supply of a movable body (e.g., a train, a vessel, an aircraft) other than the vehicle or may be used as a power supply of an electric appliance such as an information processing device.

This disclosure is not limited to the above embodiment. The above embodiment is just an example and has a configuration substantially the same as the technical idea described in claims in this disclosure. Any configuration that can yield similar effects is included the technical scope of this disclosure.

What is claimed is:

1. A battery comprising power generation units each including a positive electrode layer, a separator layer, and a negative electrode layer, wherein:
    an area of either one of the positive electrode layer and the negative electrode layer is larger than an area of the other one of the positive electrode layer and the negative electrode layer in a plan view along a thickness direction of the battery;
    the power generation units each have a non-facing region where the positive electrode layer and the negative electrode layer do not face each other;
    in the non-facing region, a first penetration portion as a hole or a cutout is placed;
    the battery includes a stacked electrode body including at least a pair of the power generation units;
    the power generation units provided as the pair are stacked along the thickness direction via a first current collector including a second penetration portion corresponding to the first penetration portions of the power generation units provided as the pair; and
    in the power generation units provided as the pair, two separator layers facing each other are fixed by a first fixing portion positioned in the first penetration portions and the second penetration portion, wherein the first fixing portion has cavities through which an electrolytic solution passes.

2. The battery according to claim 1, wherein the first fixing portion includes a member different from the two separator layers facing each other.

3. The battery according to claim 1, wherein the first fixing portion includes part of at least either one of the two separator layers facing each other.

4. The battery according to claim 1, wherein the power generation units provided as the pair are connected in parallel to each other.

5. The battery according to claim 4, wherein:
    the stacked electrode body includes a pair of power generation structural bodies each constituted by the power generation units provided as the pair and connected in parallel to each other;
    the power generation structural bodies are stacked along the thickness direction; and
    in the power generation structural bodies, two separator layers facing each other are fixed by a second fixing portion.

6. The battery according to claim 1, wherein the power generation units provided as the pair are connected in series to each other.

7. The battery according to claim 1, comprising a laminate-type outer packaging body configured to seal the stacked electrode body, wherein:
    the stacked electrode body includes an outer separator layer provided on a surface of the stacked electrode body, the surface being on a side closer to the outer packaging body; and
    the outer separator layer is fixed to the separator layer in a corresponding one of the power generation units by a third fixing portion.

* * * * *